United States Patent [19]
Michaud et al.

[11] Patent Number: 5,596,073
[45] Date of Patent: Jan. 21, 1997

[54] POLYIMIDE SOLUTIONS AND METHOD OF OBTAINING THEM

[75] Inventors: Philippe Michaud, Mobile, Ala.; Jean Russo, Lyon, France

[73] Assignee: S.N.C. Kermel, Cedex, France

[21] Appl. No.: 367,323

[22] PCT Filed: Jun. 29, 1993

[86] PCT No.: PCT/FR93/00648

§ 371 Date: Apr. 14, 1995

§ 102(e) Date: Apr. 14, 1995

[87] PCT Pub. No.: WO94/02535

PCT Pub. Date: Feb. 3, 1994

[30] Foreign Application Priority Data

Jul. 23, 1992 [FR] France .................... 92 09327

[51] Int. Cl.$^6$ .................... C08G 73/10; C08G 69/08
[52] U.S. Cl. .................... 528/353; 528/48; 528/53; 528/125; 528/128; 528/171; 528/172; 528/173; 528/174; 528/185; 528/188; 528/220; 528/229; 528/310; 528/342; 528/350; 525/422
[58] Field of Search ............... 528/53, 48, 172, 528/173, 342, 185, 171, 188, 174, 353, 350, 310, 128, 220, 125, 229; 525/422

[56] References Cited

U.S. PATENT DOCUMENTS 4,795,795   1/1989   Kouno et al. .................... 528/53

FOREIGN PATENT DOCUMENTS 0194058   9/1986   European Pat. Off. .

OTHER PUBLICATIONS

Chemical Abstracts, vol. 111, No. 18, 30 Oct. 1989, Columbus, Ohio, US; Abstract No. 154646n, "Preparation of heat–resistant polyamides or polyimides" see Abstract & JP, A. 01054019 (Mitsui) 1 Mar. 1989.

*Primary Examiner*—Shelley A. Dodson
*Assistant Examiner*—P. Hampton-Hightower
*Attorney, Agent, or Firm*—Watson Cole; Stevens Davis, P.L.L.C.

[57] ABSTRACT

The present invention relates to solutions which can be directly shaped in anhydrous dimethylalkyleneurea, based on a polyimide obtained from an aromatic dianhydride and an aromatic diisocyanate.

It also relates to the process for the production of the above solutions, as well as to a process for spinning these solutions and to the yarns and fibres thus obtained.

16 Claims, No Drawings

POLYIMIDE SOLUTIONS AND METHOD OF OBTAINING THEM

BACKGROUND OF THE INVENTION

1. Field of the Invention

The present invention relates to polyimide-based solutions which can be directly spun and shaped.

It also relates to a process for producing these solutions and to a process for the spinning thereof.

2. Background Discussion

The preparation of polyimides from diisocyanates and acids or anhydrides has been known for a long time.

Thus, FR 2,107,998 describes the preparation of polyimides resulting from 3,3',4,4'-benzophenonetetracarboxylic acid dianhydride and diisocyanates. However, such a reaction requires an extremely long reaction time which makes this process expensive for industrial application.

To reduce the reaction time between diisocyanates and dianhydrides, while producing polymers with a sufficient molecular weight to make possible their conversion, and soluble in the usual solvents according to U.S. Pat. No. 4,001,186, the polycondensation has been carried out in the presence of catalysts such as alkali metal methoxides.

EP 0,235,388 also recommends the use of a catalyst, alkali metal fluoride, optionally in combination with a quaternary onium salt, to produce gel-free polyimides.

However, the presence of catalysts is not a favourable component in the production of polyimides, because, in order to produce shaped articles, in particular yarns having good characteristics, the catalyst must be removed before conversion or spinning and this removal is difficult to carry out straightforwardly. Furthermore, for costs reasons, recycling of the catalyst is necessary industrially.

SUMMARY OF THE INVENTION

It has now been found that it was possible to produce soluble polyimides having a high molecular weight, in the form of solutions which can be directly shaped and spun, without requiring either a catalyst or a long reaction time. More particularly, the present invention relates to clear solutions which can be directly spun and shaped, containing: from 5 to 35% by weight of a polyimide comprising repeating units of formula:

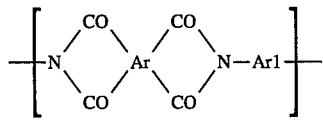

in which Ar represents a tetravalent group of formula

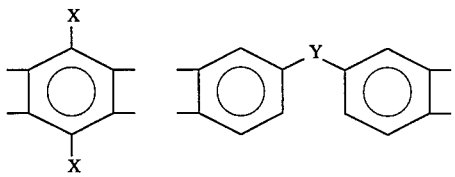

with X: monovalent radical, identical or different, such as H, —CH$_3$, —CF$_3$,

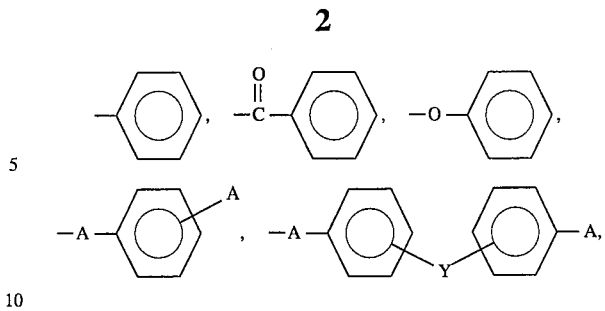

or none

Y=CO, O, SO$_2$, S, C(CH$_3$)$_2$, CH$_2$ or C(CF$_3$)$_2$ divalent radical or none, and A=divalent radical with the same meaning as Y, which cannot be none, and Ar1 represents a divalent aromatic group, in anhydrous dimethylalkyleneurea (DMAU), with a pH$\leq$7.

The group Ar preferably represents a group of formula:

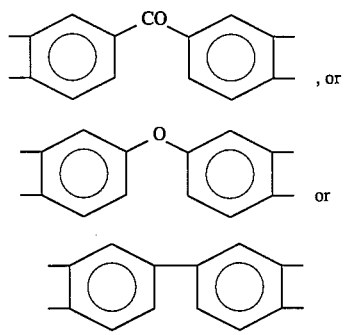

Ar1 preferably comprises at least 50% of tolylene groups.

Such polymers furthermore have a low polydispersity index, which corresponds to a narrowing of the molecular mass distribution. The polydispersity index (I) of the polyimides according to the invention is generally approximately 2 or even less.

The present invention also relates to a process for producing clear, polyimide-based solutions which can be directly spun or shaped by a polycondensation reaction in anhydrous dimethylalkyleneurea (DMAU), with a pH$\leq$7, in the absence of catalyst, at a temperature between 150° C. and the boiling point of the solvent, the duration of the reaction being less than or equal to 6 hours, preferably less than or equal to 5 hours, and then dilution of the polymer in anhydrous dimethylalkyleneurea, with a pH$\leq$7. The polymer concentration before dilution is generally between 10 and 40%, preferably 15 and 35%, by weight and the final concentration in the solvent is between 5 and 30%.

DETAILED DESCRIPTION OF THE PREFERRED EMBODIMENTS

The solutions according to the present invention are prepared by reaction in anhydrous DMAU, with a pH$\leq$7, in substantially stoichiometric proportions, between:

a diisocyanate of formula OCN—Ar1—NCO in which Ar1 represents a divalent aromatic group, preferably a group consisting of at least 50% of tolylene groups, a tetracarboxylic acid dianhydride of formula:

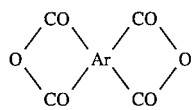

in which Ar represents a tetravalent radical of formula such as:

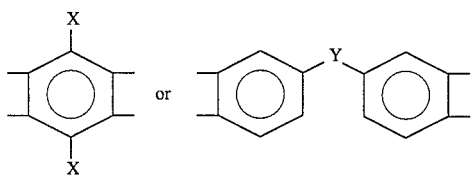

X representing an identical or different monovalent radical such as:

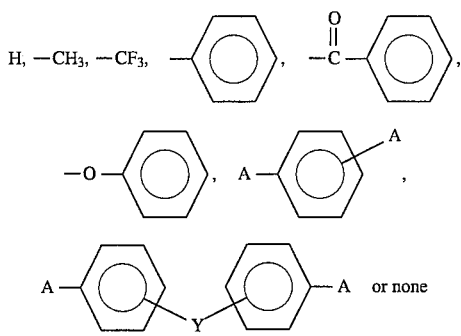

with A and Y identical or different divalents of formula: O, S, or CO, $SO_2$, $C(CH_3)_2$, $CH_2$, $C(CF_3)_2$ or none, it not being possible for A not to exist, at a temperature between 150° C. and the boiling point of the solvent, preferably at a temperature between 180 and 200° C., for a duration less than or equal to 6 hours, preferably less than or equal to 5 hours. The diisocyanate/dianhydride molar ratio is preferably between 1 and 1.05.

In order to produce polyimides according to the invention, 2,4- or 2,6-toluylene diisocyanates are preferably used. Toluylene diisocyanate (TDI) exists, in commerce, in the form of a mixture of 2,4- and 2,6-toluylene diisocyanates—(2,4- and 2,6-TDI). It is preferable that the mixture consists of at least 60% of 2,4-TDI. Other aromatic isocyanates can be suitable. This is the case, for example, with naphthalene diisocyanate, m-phenylene diisocyanate, 4,4-(diisocyanato)diphenyl ether, or their mixtures.

It is optionally possible to add, to the abovementioned diisocyanates, a minor proportion of another aromatic or cycloaliphatic diisocyanate for the purpose of improving certain properties of the shaped articles; for example, it can be advantageous, to improve the mechanical properties of the fibres obtained, to substitute up to 30% of TDI by meta- or para-phenylene diisocyanate or 4,4-(diisocyanato)diphenyl ether or naphthalene diisocyanate.

Among the dianhydrides which can be used in the context of the present invention, it is possible to mention the dianhydrides of pyromellitic acid, 3,3',4, 4'-diphenyltetracarboxylic acid, 2,3,6,7 naphthalenetetracarboxylic acid, 3,3',4,4'-diphenylether tetra carboxylic acid or 3,3',4,4'-diphenyl sulphone tetracarboxylic acid and, preferably, 3,3', 4,4'-benzophenonetetracarboxylic acid dianhydride. A number of these dianhydrides can be used in a mixture.

The term dimethylalkyleneurea used in the description is understood to mean dimethylethyleneurea or dimethylpropyleneurea.

The latter is used in the anhydrous form, that is to say that it contains less than 1000 ppm of water, preferably less than 500 ppm.

Although substantially anhydrous, the DMAU must have a pH≦7. This measurement can be carried out straightforwardly by means of a pH indicator paper moistened beforehand.

The polyimides according to the invention are easy to prepare in homogeneous medium and have both sufficiently high molecular masses to make possible the production of shaped articles, yarns, films, and the like having good properties and a particularly good solubility in DMAU to make possible conversion, film-forming or spinning, for example, under good conditions.

Furthermore, the reaction is carried out over a short time of less than 6 hours, generally less than 5 hours, and without catalyst, thus avoiding the technical disadvantages and the higher costs due to the catalysts.

The good properties of the solutions according to the invention are linked both to the starting monomers and to the presence of DMAU which makes it possible directly to obtain high viscosities which make possible spinning, film-forming or any conversion from the solutions.

Other usual solvents, such as dimethylacetamide (DMAC), dimethylformamide (DMF) or N-methylpyrrolidone do not lead from the same monomers to polymers with a sufficiently high viscosity.

The polyimide solutions according to the invention can be film-formed or spun according to the dry or wet processes.

Among the polar organic solvents which can be used, dimethylalkyleneurea, for example dimethylethyleneurea or dimethylpropyleneurea, is used. These spinning solutions must furthermore have a viscosity which makes it possible to spin them, generally between 300 and 1000, preferably 500 and 800 poises for wet spinning, and 1500 to 3000 poises for dry spinning, measured by means of a viscometer known commercially under the trade name Epprecht Rheomat 15.

The solution to be spun can have a polymer concentration between 10 and 35%, preferably between 15 and 25%. It can contain various adjuvants intended to modify the final properties or appearance of the yarns obtained, such as dyes, delustering agents, stabilising agents and the like.

The temperature of the spinning solution can vary within wide limits according to the viscosity of the solution to be spun. For example, a solution having a low viscosity can easily be extruded at ordinary temperature, whereas it is preferable to extrude a solution of high viscosity while hot, for example at 120° C. or even more, to avoid using excessively high pressures in the die.

The dry or wet processes for spinning in solution are carried out in the usual way: after the formation of the filaments, the latter are generally drawn to give them mechanical properties, washed in a known way to remove the residual solvent, dried and optionally overdrawn at high temperatures to give the filaments the desired mechanical properties.

The polyimide-based yarns have notable mechanical characteristics and an excellent thermomechanical strength, as well as a good fire resistance.

The examples below are given as indicative and non-limiting in order to illustrate the invention.

EXAMPLE 1:

Equipment: 1.5 l glass reactor, equipped with a stainless steel, anchor-type stirrer, a 250 ml dropping funnel intended for the addition of the dilution solvent, a nitrogen inlet via a bubble-counter, speed of rotation 85 r/min, with a thermometer probe and with a reflux condenser with a bubble-counter on the outlet. The outlet of the reflux condenser is connected to a column packed with 600 g of soda lime intended to trap the carbon dioxide which is given off during the polycondensation reaction. A balance placed close to the assembly makes it possible to record the increase in weight of the column packed with soda lime (direct access by weight to the $CO_2$ given off).

Heating of the reactor is brought about by a silicone oil bath operated by a control system aided by a transmitter of a programme for raising the temperature and optionally for maintaining a constant temperature at a given temperature.

Reactants:

| | |
|---|---|
| - 3,3',4,4'-benzophenonetetracarboxylic acid dianhydride (BTDA) | ... 161 g (0.5 mol) |
| - toluylene diisocyanate (TDI) consisting of 80 % 2,4-TDI and 20 % 2,6-TDI | ... 87.2 g (0.50125 mol) |
| - polycondensation dimethylethyleneurea (DMEU) | ... 454 g |
| - dilution DMEU | ... 313 g. |

Procedure: The apparatus being purged by a stream of nitrogen for 1 hour, the DMEU reserved for the polycondensation reaction and the reactants are charged under a slight nitrogen counterstream and the stirrer is switched on, the heating of the reaction mass being begun immediately, the temperature being raised progressively from room temperature to 185° C. over 3 hours 30 min.

The reaction mass, whose solids concentration is 31% by weight, is very viscous. The oil bath is removed and the dilution DMEU is added: the solids concentration falls from 31% by weight to 21%.

The operation is abandoned, stirring stopped, under slight nitrogen overpressure. When the temperature of the mass has fallen to 50° C., the reactor is dismantled and the solution stored in a 1l glass container.

By IR and NMR analysis, it is confirmed that the formation of imide groups is total.

Results:

The solution, with a viscosity of 370 poises, is perfectly homogeneous and capable of forming films and yarns.

The viscosity is measured by means of an Epprecht Rheomat 15 viscometer –D+E vessel at 25° C.

EXAMPLE 2

| Example 1 is reproduced with the following monomers: | |
|---|---|
| - 3,3',4,4'-diphenyl ether tetracarboxylic acid dianhydride | 155 g |
| - toluylene diisocyanate | 87.2 g |
| - polycondensation DMEU | 441 g |
| - dilution DMEU | 304.8 g |

The reaction is carried out in the way shown in Example 1, the temperature being raised from room temperature to 185° C. over a period of 2 hours.

By IR and NMR analysis, it is confirmed that the formation of imide groups is total.

A solution is obtained with a concentration of 31% and, after dilution in DMEU, with a concentration of 21%; the viscosity of the solution obtained is 470 poises, measured on the viscometer shown in Example 1.

It is homogeneous, clear, and easy to convert.

EXAMPLE 3

Example 1 is reproduced using the following monomers:

| | |
|---|---|
| 1,3-phenylene diisocyanate (mPDI) | 4.44 g (0.01 mol) |
| 2,2'-hexafluoroisopropylidene-bis(phthalic acid) dianhydride of formula | 1.60 g (0.01 mol) |

| | |
|---|---|
| polycondensation DMEU | 13.95 g |
| dilution DMEU | 5.45 g. |

The reaction is carried out in the way shown in Example 1, the temperature being raised progressively from room temperature up to approximately 198° C. over a period of approximately 3 hours.

The polyimide concentration is 27% and passes to 21% after dilution.

It is homogeneous and clear.

By IR and NMR analysis, it is confirmed that the formation of imide groups is total.

We claim:

1. A clear solution which is directly shapable and spinnable, which contains 5 to 35% of a polyimide comprising repeating units of formula:

wherein Ar represents a tetravalent group of formula:

X representing an identical or different monovalent radical selected from

-continued

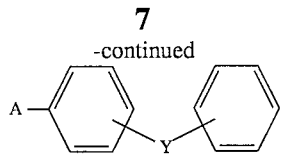

Y and A are identical or different divalent radicals, Y is selected from the group of bond, CO, O, $SO_2$, S, $C(CH_3)_2$, $CH_2$ or $C(CF_3)_2$; A is selected from the group of CO, O, $SO_2$, S, $C(CH_3)_2$, $CH_2$ or $C(CF_3)_2$; and $Ar_1$ is a divalent aromatic group;

in anhydrous dimethylalkyleneurea (DMAU), with a pH≦7, and containing less than 1000 ppm of water, and wherein the solution does not contain carbonate, hydrocarbonate, alkali hydroxyl, or alkali salts of polycarboxilic acids.

2. The solution according to claim 1, wherein $Ar_1$ consists of at least 50% of toluylene groups.

3. The solution according to claim 1, wherein the DMAU is dimethylethyleneurea.

4. The solution according to claim 1, wherein the group Ar has the formula:

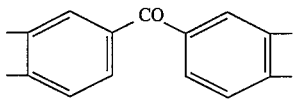

5. A process for producing a polyimide-based solution which is directly spinnable and shapable by:

polycondensation, in a solvent comprising anhydrous dimethylalkyleneurea, with a pH≦7, in the absence of catalyst, in a substantially stoichiometric proportion, between:

a tetracarboxylic acid dianhydride of formula:

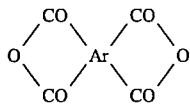

wherein Ar represents a tetravalent radical of formula:

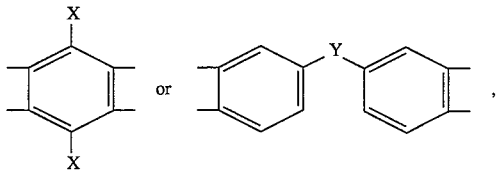

X representing an identical or different monovalent radical selected from

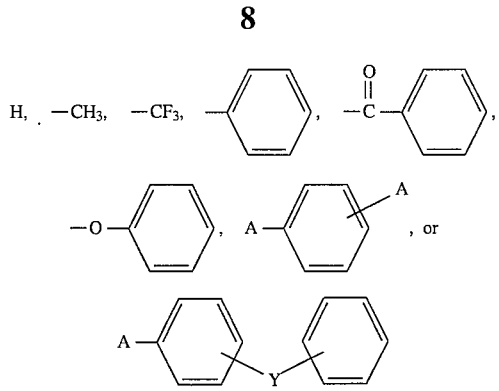

Y and A representing identical or different divalent radicals, Y is selected from bond, CO, O, $SO_2$, S, $C(CH_3)_2$, $CH_2$ or $C(CF_3)_2$, A is selected from CO, O, $SO_2$, S, $C(CH_3)_2$, $CH_2$ or $C(CF_3)_2$; and a diisocyanate of formula $OCN-Ar_1-NCO$ wherein $Ar_1$ represents a divalent aromatic group;

at a temperature between 150° C. and the boiling point of the solvent, for a period less than or equal to 6 hours, and then dilution of the polyimide obtained in anhydrous dimethylalkyleneurea, with a pH≦7, the final concentration in the solvent being between 5 and 35 %.

6. The process according to claim 5, wherein the reaction is carried out at a temperature between 180° and 200° C.

7. The process according to claim 5, wherein the duration of the reaction is less than or equal to 5 hours.

8. The process according to claim 5, wherein the diisocyanate/dianhydride ratio by weight is between 1 and 1.05.

9. A process for spinning the solution according to claim 1, wherein the spinning is carried out wet or dry.

10. A product selected from yarn or fiber resulting from the wet or dry spinning of the solution according to claim 1.

11. A product selected from yarn or fiber resulting from the wet or dry spinning of the solution according to claim 2.

12. A product selected from yarn or fiber resulting from the wet or dry spinning of the solution according to claim 3.

13. A product selected from yarn or fiber resulting from the wet or dry spinning of the solution according to claim 4.

14. The solution according to claim 1, wherein Y is selected from the group consisting of CO, O, $SO_2$, S, $C(CH_3)_2$, $CH_2$ or $C(CF_3)_2$.

15. A product selected from yarn or fiber resulting from the wet or dry spinning of the solution according to claim 14.

16. The process according to claim 5, wherein Y is selected from the group consisting of CO, O, $SO_2$, S, $C(CH_3)_2$, $CH_2$ or $C(CF_3)_2$.

* * * * *